US011030827B2

(12) United States Patent
Grix et al.

(10) Patent No.: US 11,030,827 B2
(45) Date of Patent: Jun. 8, 2021

(54) METHOD AND APPARATUS FOR DYNAMIC DISTRIBUTED SERVICES REDISTRIBUTION

(71) Applicant: FORD GLOBAL TECHNOLOGIES, LLC, Dearborn, MI (US)

(72) Inventors: Jason Grix, Livonia, MI (US); Thomas Madden, Plymouth, MI (US); Joseph Patrick Oravec, Livonia, MI (US); Matthew Liwienski, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 15/870,487

(22) Filed: Jan. 12, 2018

(65) Prior Publication Data

US 2019/0221050 A1 Jul. 18, 2019

(51) Int. Cl.
| | |
|---|---|
| *G07C 5/00* | (2006.01) |
| *G06F 9/445* | (2018.01) |
| *G06F 9/46* | (2006.01) |
| *H04L 12/24* | (2006.01) |
| *H04L 29/08* | (2006.01) |
| *G06F 9/455* | (2018.01) |

(52) U.S. Cl.
CPC .............. *G07C 5/008* (2013.01); *G06F 9/445* (2013.01); *G06F 9/46* (2013.01); *H04L 41/5054* (2013.01); *H04L 67/2885* (2013.01); *G06F 2009/45595* (2013.01)

(58) Field of Classification Search
CPC . G07C 5/008; H04L 41/5054; H04L 67/2885; G06F 9/46; G06F 2009/45595
See application file for complete search history.

(56) References Cited

U.S. PATENT DOCUMENTS

| | | | |
|---|---|---|---|
| 9,337,998 B2 | 5/2016 | Iqbal et al. | |
| 9,418,489 B2* | 8/2016 | Macdonald | ............ H04W 76/10 |
| 9,635,580 B2 | 4/2017 | Sundaram | |
| 2008/0268828 A1* | 10/2008 | Nagaraja | ................. G06F 9/505 455/419 |
| 2012/0089684 A1* | 4/2012 | Angus | ...................... H04L 47/22 709/206 |
| 2015/0180952 A1* | 6/2015 | Yang | ........................ H04L 67/02 709/201 |
| 2015/0181417 A1* | 6/2015 | Snider | ................... H04L 67/125 370/338 |
| 2016/0261291 A1* | 9/2016 | Colella | ................ H04B 1/0064 |
| 2018/0234922 A1* | 8/2018 | Meredith | ............ H04L 43/0847 |

FOREIGN PATENT DOCUMENTS

WO WO 2016/055844 A2 4/2016

* cited by examiner

*Primary Examiner* — Joe Chacko
(74) *Attorney, Agent, or Firm* — Michael Spenner; Brooks Kushman P.C.

(57) ABSTRACT

A system includes a processor configured to detect an application initiation request. The processor is further configured to determine whether current vehicle connectivity availability is sufficient to support remote execution of the application. Also, the processor is configured to launch a local version of the application, responsive to determining that current vehicle connectivity is insufficient to support remote execution. The processor is further configured to request that a remote server launch an instance of the application, once current vehicle connectivity is sufficient to support remote execution.

18 Claims, 8 Drawing Sheets

METHOD AND APPARATUS FOR DYNAMIC DISTRIBUTED SERVICES REDISTRIBUTION

TECHNICAL FIELD

The illustrative embodiments generally relate to methods and apparatuses for dynamic distributed services redistribution.

BACKGROUND

Many vehicles come equipped with onboard computers, capable of providing internal processing, application handlings and general computing functionality relating to a wide variety of processes and procedures onboard a vehicle. At the same time, the power and accessibility of cloud services has grown significantly, and cloud-based computing can provide access to extremely powerful computing engines, typically much more powerful and much faster than anything available onboard a vehicle.

Cloud-based computing services do come with a requirement that data to be used by the vehicle be transferred back to the vehicle, and data to be used in processing be transferred from the vehicle to the cloud. The transfer imposes a time constraint on service processing, and depending on the amount of data to be transferred, bandwidth limitations can constrain the services further by slowing data transfer to the level (volume and speed) available based on current bandwidth.

SUMMARY

In a first illustrative embodiment, a system includes a processor configured to detect an application initiation request. The processor is further configured to determine whether current vehicle connectivity availability is sufficient to support remote execution of the application. Also, the processor is configured to launch a local version of the application, responsive to determining that current vehicle connectivity is insufficient to support remote execution. The processor is further configured to request that a remote server launch an instance of the application, once current vehicle connectivity is sufficient to support remote execution.

In a second illustrative embodiment, a computer-implemented method includes receiving an application-launch request for a vehicle application. The method also includes determining whether to launch the application locally or remotely, based on whether current vehicle connectivity is sufficient to support remote execution of the application. The method further includes executing the application locally or instructing remote execution of the application, responsive to the determination.

In a third illustrative embodiment, a non-transitory computer readable storage medium stores instructions that, when executed by a processor, cause the processor to perform a method including monitoring current remote connectivity capability to determine whether the capability can support a given local application executing remotely from a processor-containing entity, but on behalf of the processor-containing entity, or whether the capability is such that the given local application should continue to execute locally, for each of a plurality of locally executing applications. The method further includes monitoring current remote connectivity capability to determine whether the capability can continue support a given remote application executing remotely from the processor-containing entity on behalf of the processor-containing entity or whether the capability is such that the given remote application should begin to execute locally, for each of a plurality of remotely executing applications. Further the method includes transferring execution of the locally and remotely executing applications in accordance with the determinations relating to connectivity.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
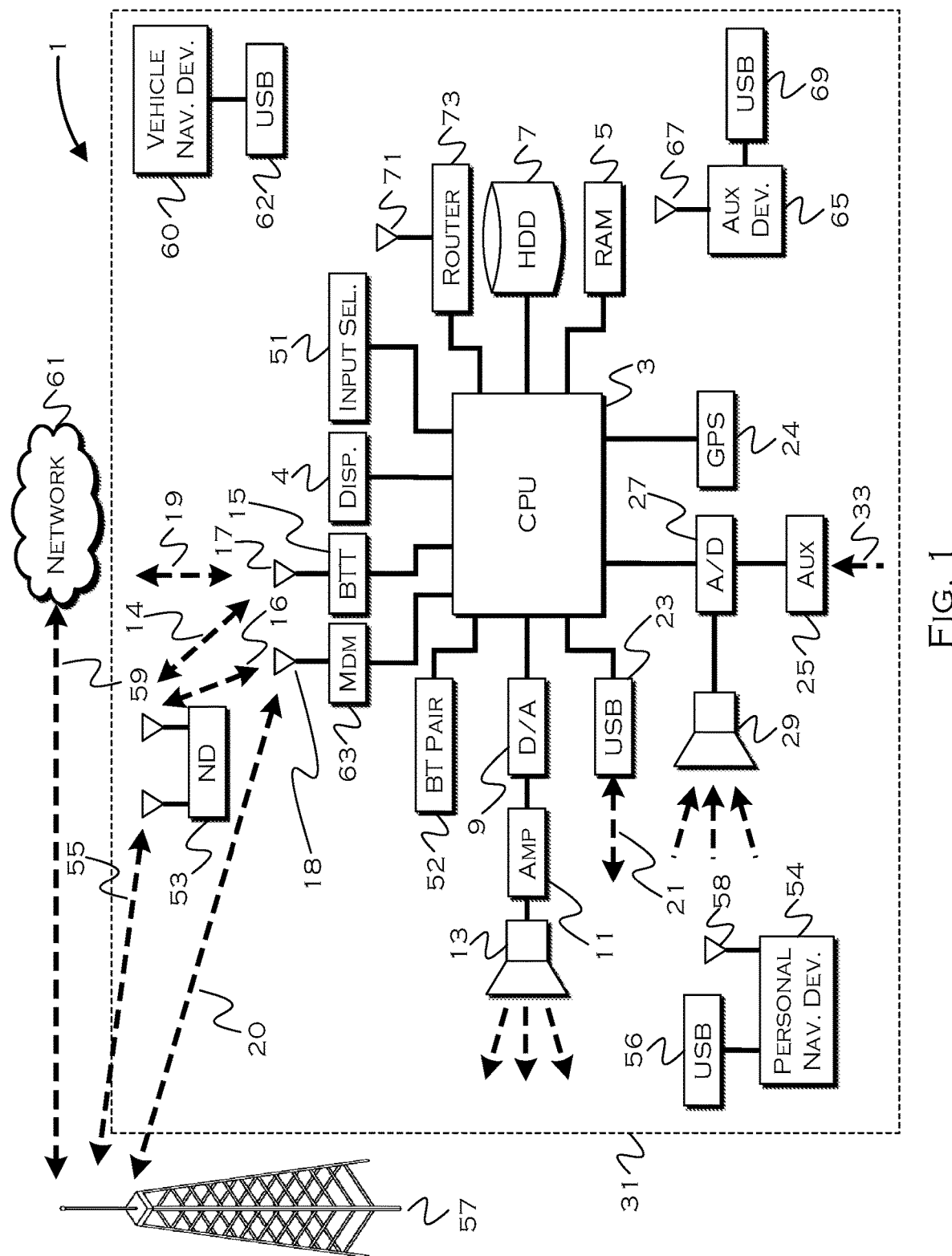
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In many vehicular computing scenarios, vehicles have access to both local and remote computing power to handle processes and digital services. While the remote processing is almost always more powerful than local processing, communication limitations and disruptions can balance out the effectiveness of one approach versus the other. The illustrative embodiments propose methods and apparatuses for dynamically choosing local or remote processing, based on how communication constraints may effect the net handling time or other utility parameters.

FIGS. 2A-2E show illustrative distribution of computing services. Whenever there is no connectivity, the process executes all possible services locally. Once connectivity is established, the system offloads as many services to the cloud as possible. Over the course of a journey, the system will pass handling back and forth between the vehicle and cloud, depending on communication variation and how that will impact effectiveness of cloud computing as opposed to executing the functions onboard (typically requiring little to no remote communication).

Figure 2A:
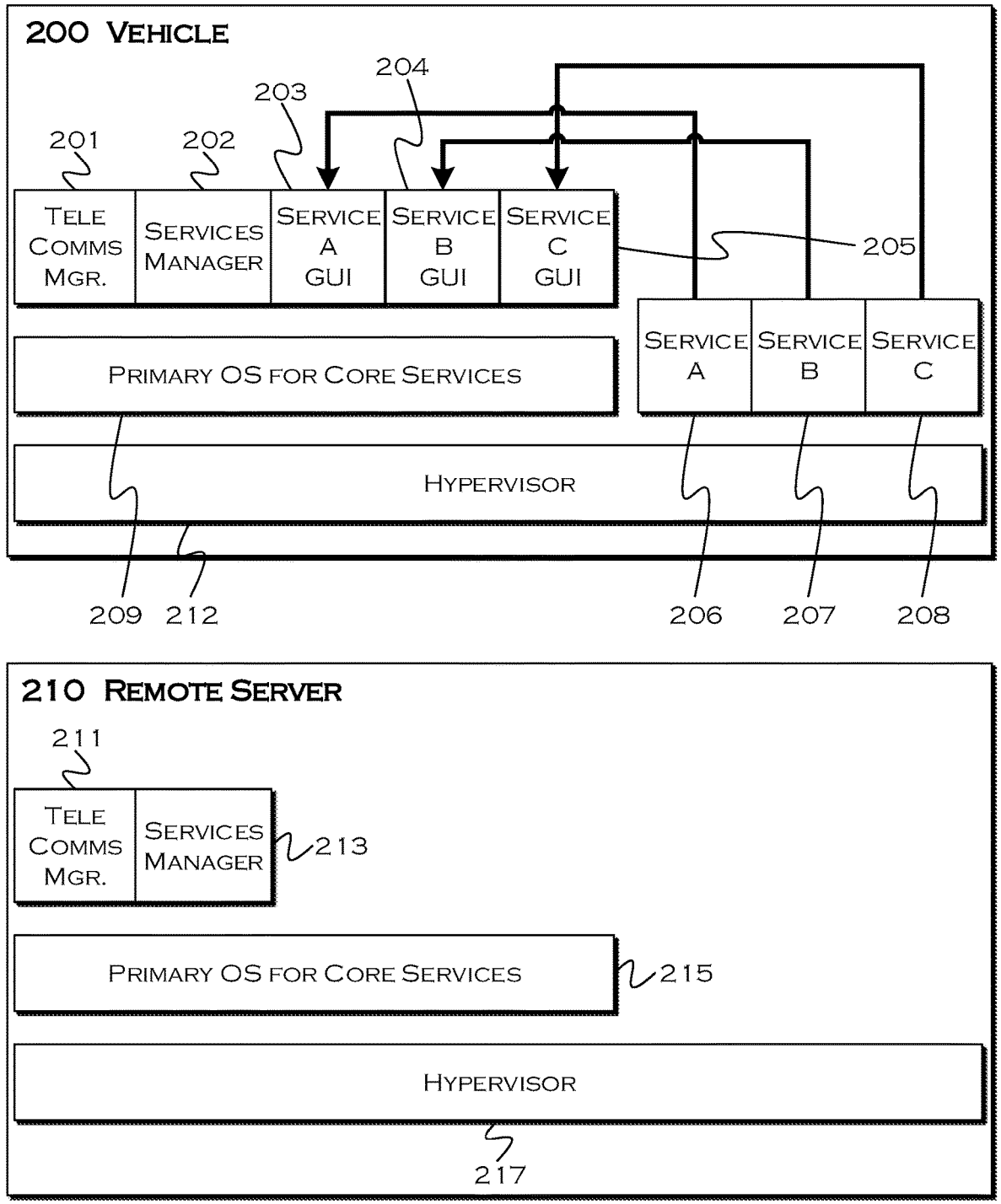
FIGS. 2A-2E show illustrative distribution of computing services.

FIG. 2A shows an illustrative example of a system executing a series of services A, B and C, when no connectivity is available. This could be, for example, upon startup, or any time a remote signal cannot be established (or reliably established).

The vehicle 200 includes an onboard telematics and communication manager 201. The vehicle also executes a services manager 202. Services A, B and C include respective graphic user interfaces (GUI) 203, 204 and 205. These GUIs execute locally via a primary operating system 209, and may exist whether the applications are onboard or offboard. Wherever the application is executing (locally or remotely), the GUI provides the user interface for the application. Here, the applications (A 205, B 206, and C 207) are all executing locally under the purview of a hypervisor 212.

A remote server 210 is available, which also includes a telematics and communication manager 211 and services manager 213, executing under control of a primary operating system 215. A hypervisor can manage services executing on the remote server, but since there is no connectivity in this example, the remote server has not begun executing any processes on behalf of the vehicle.

Figure 2B:
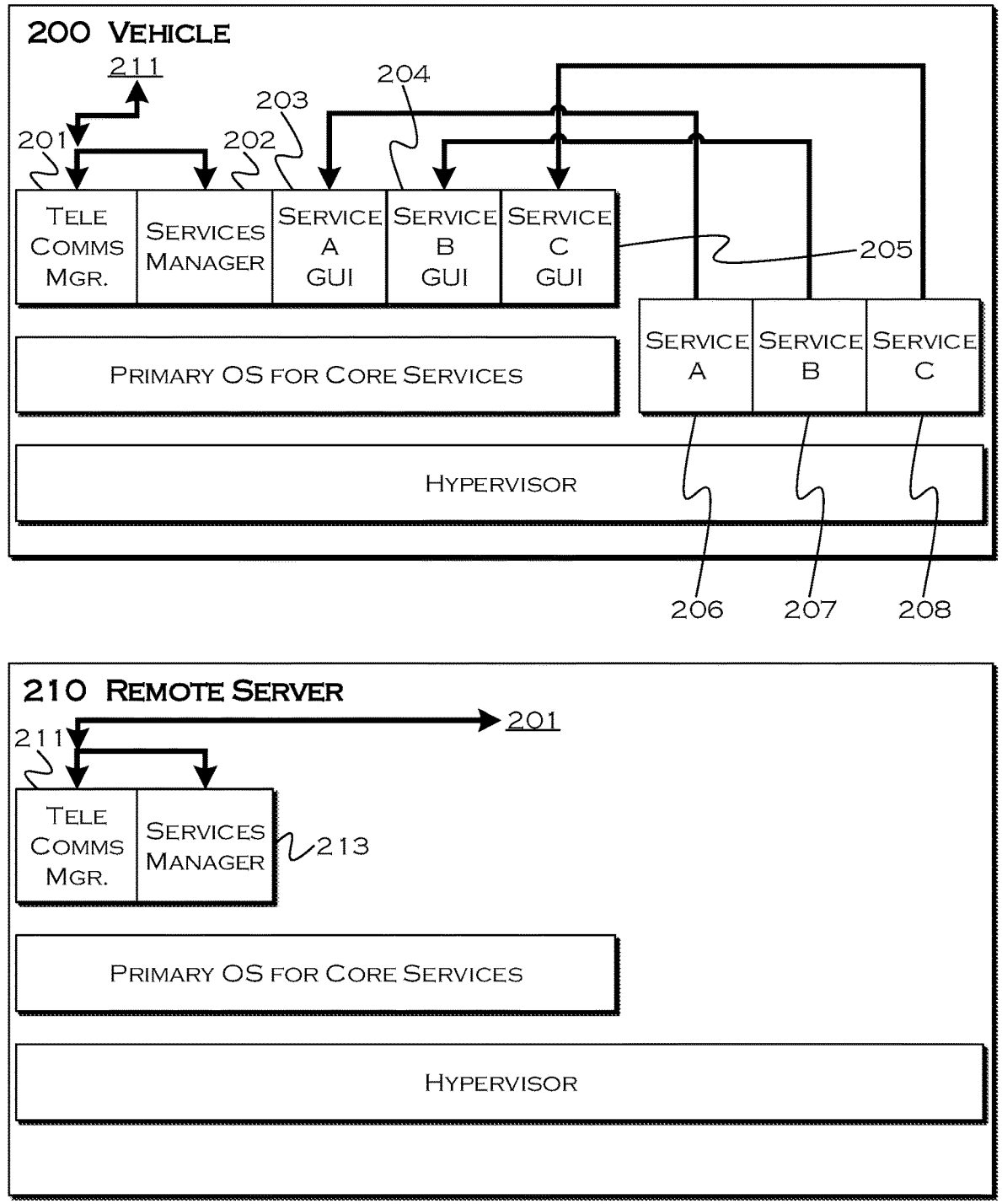

FIG. 2B shows communication procedures as communication becomes available. In this example, the local services manager 202, which may be managing the services A, B and C, uses the telematics communication manager 201 to communicate with the remote telematics communication manager 211. The remote services manager 213 can talk to the local services manager through the communication link between the communication modules.

How many services will be passed to the remote server may be a function of available bandwidth and/or a type of connection. The system, through onboard service management and an understanding of available connections, may pass whatever services that may benefit the most from a combination of the remote processing and connection. A service that requires very limited data transfer may also require limited processing, but still may be passed to the remote server in favor of a processing-intensive service (which would be more effectively run remotely) that also requires significant data-passing, if the connection is poor, the bandwidth is low, etc. If the bandwidth increases and/or the connection becomes more reliable, the process may swap the two services, since the system will benefit from having the latter service run on the cloud if the communication connection can handle the necessary data transfer. This sort of balancing can be used to dynamically pass service handling between the cloud and vehicle as connections permit.

Figure 2C:
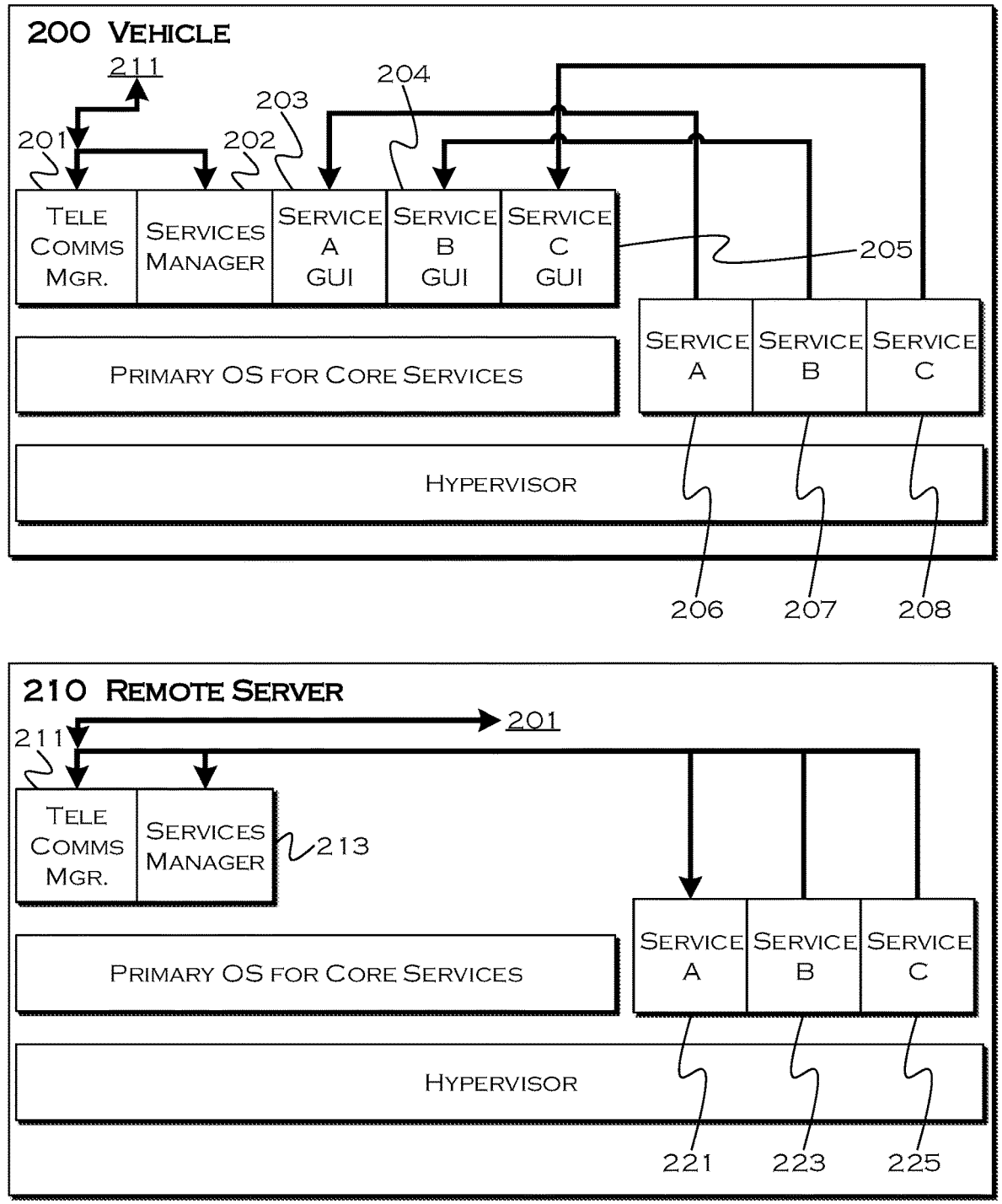
Figure 2D:
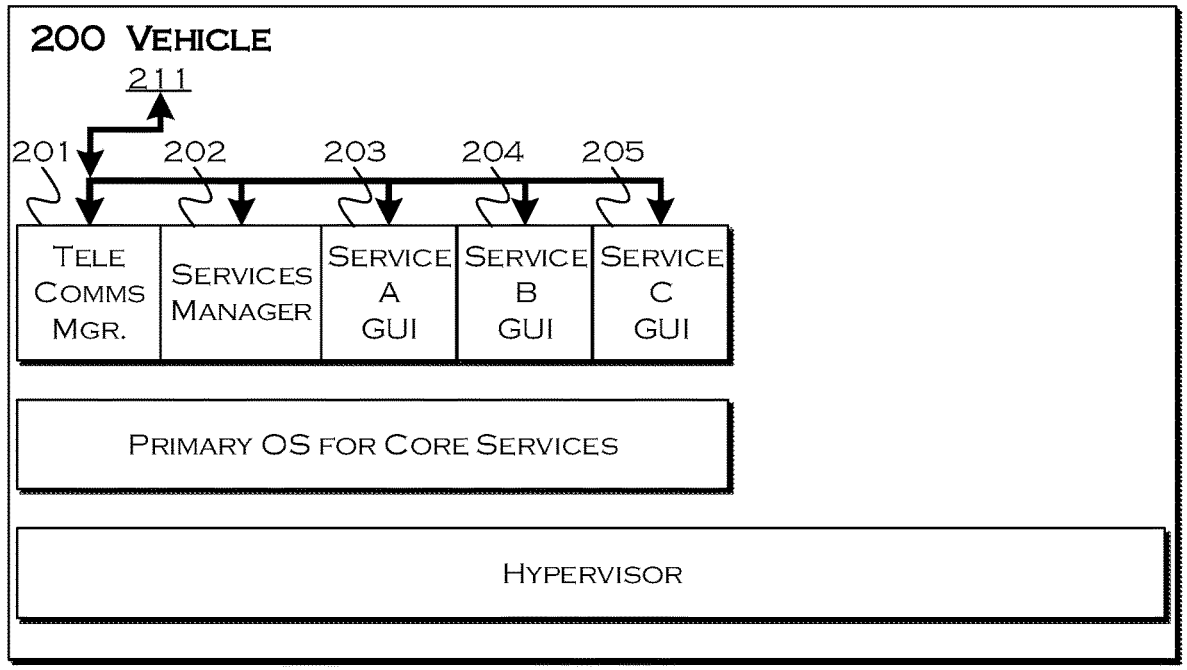
Figure 2D:
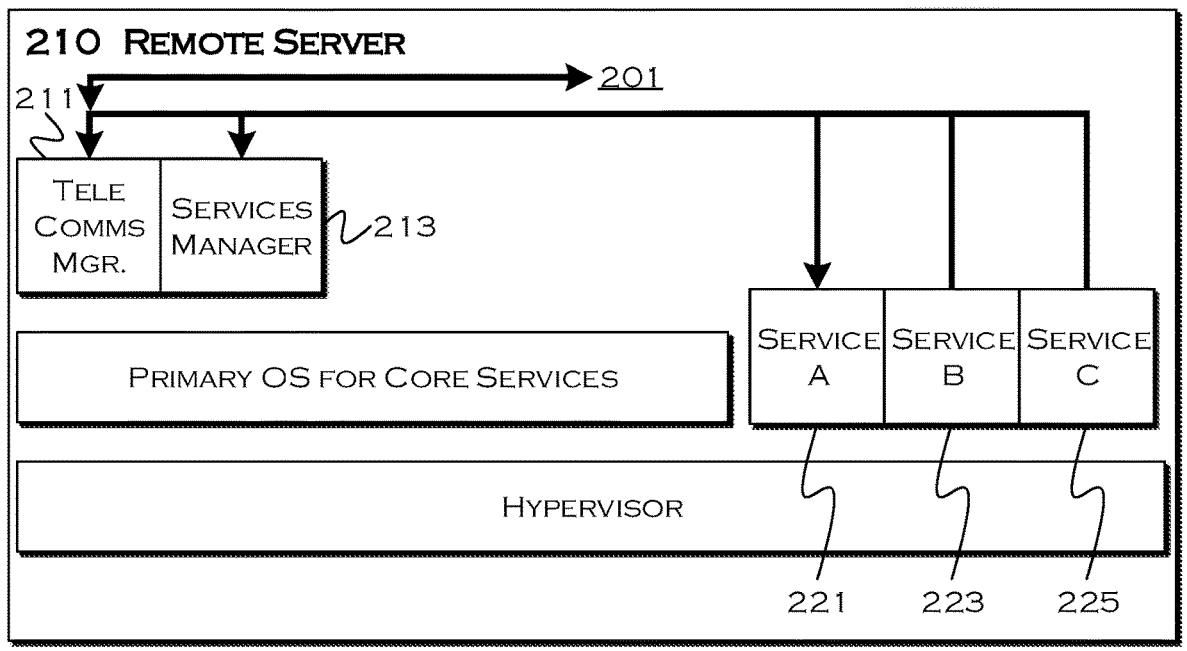
Figure 2E:
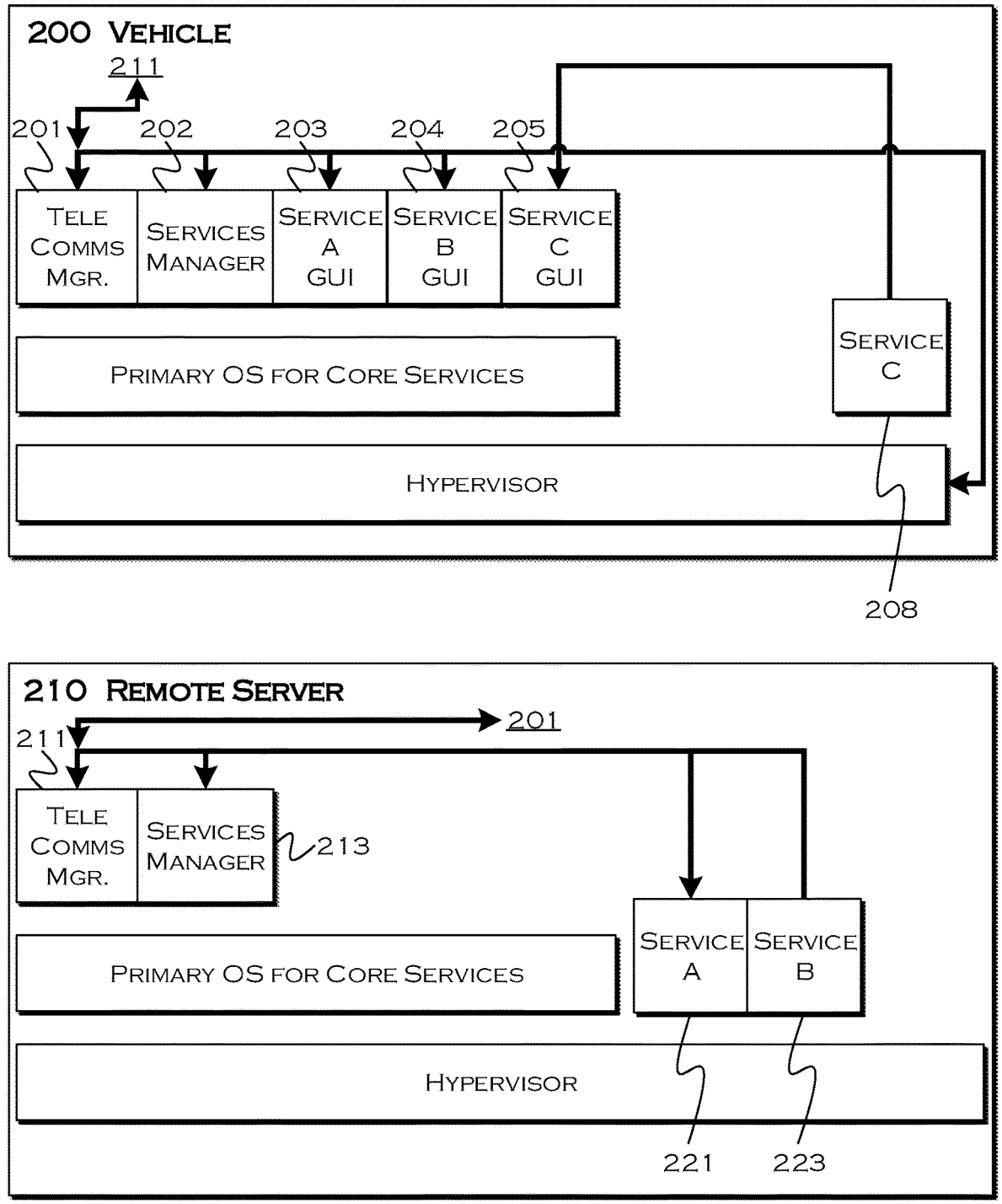

FIG. 2C shows the spin-up of services on the remote server 210, after the handling instructions have been passed from the local services manager to the remote services manager. Any data needed to continue service provision can also be provided, so that remote services A 221, B 223 and C 225 can continue with limited to no interruption or reset. Once the remote services have successfully spun up, as in FIG. 2D, the local service manager can spin down the local versions of those services. Passing all service handling, such as in this example, may be done when a high bandwidth, reliable connection exists. If the connection is not sufficient to handle the data transfer needs of all services, the local service manager may keep one or more services executing locally. The local service GUIs continue to provide interfacing with the services, but now through the telematics communication module, which can pass commands to the remote server and output back to the GUIs.

At some point, the local service handling process may determine that communication is insufficient to handle the requests and data from all services executing remotely. The local service manager (or other appropriate module) can request that the vehicle hypervisor spin up a local copy of a remote service 208. Any preservation data (for continuing service uninterrupted) can be passed back locally, and the local GUI can now interact directly with the local instance of the service. The remote server can spin down the remote service, until such time as there is sufficient bandwidth to resume remote execution of the service. If communication is lost completely, or is insufficient to handle data transfer reliably for any remote service, the service handling process can spin back up all processes locally.

Figure 3:
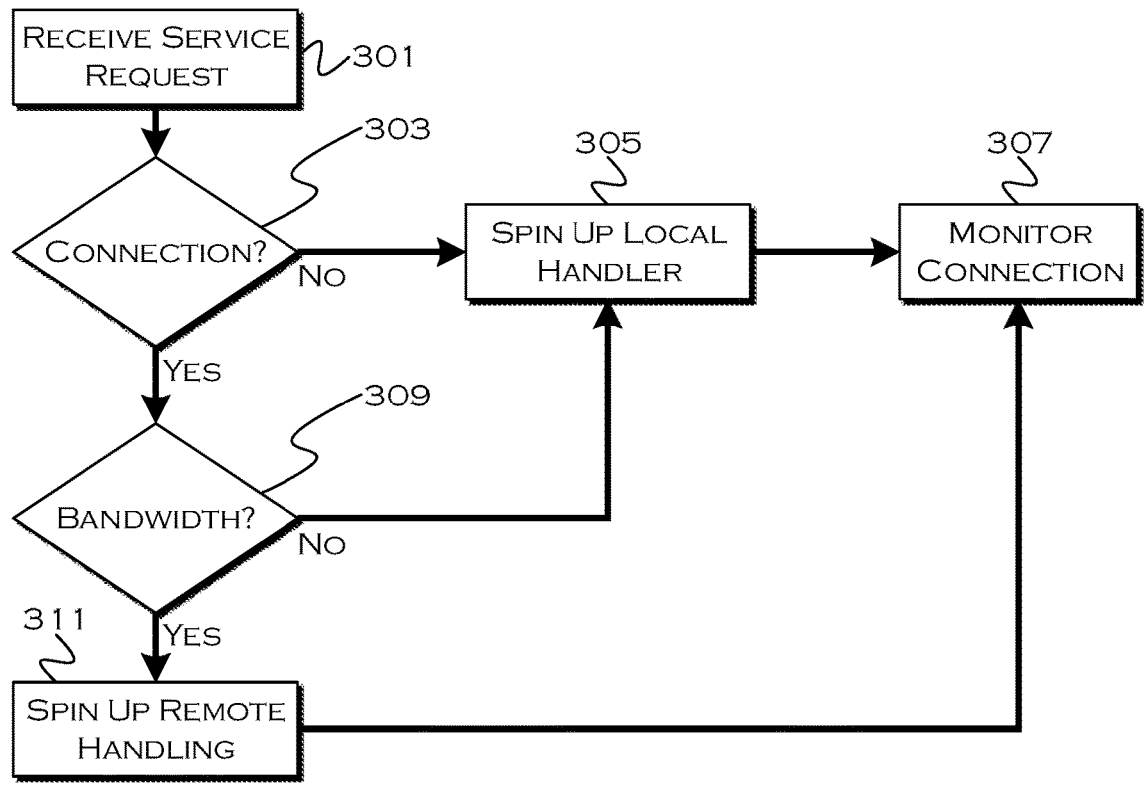
FIG. 3 shows an illustrative process for service request handling.

FIG. 3 shows an illustrative process for service request handling. In this illustrative example, a process executing at the vehicle receives 301 a service request. The user could launch an application, or the service could be a vehicle support service supporting some form of onboard functionality. Other requests could include designated automatic application launching or other services that may run upon startup, on demand, or activated automatically.

The process may determine 303 if a connection is available for use by the service. This can include, for example, a cellular connection, a Wi-Fi connection or any other connection usable to transfer data and support remote execution of the service. If there is no connectivity whatsoever, the process will spin up 305 a local instance of the service, using an onboard processor. While the service is executing, the process will also monitor 307 connection availability, and if the connection becomes available, the process can pass handling to a remote version of the service, by requesting remote spin up and passing any needed data.

If there is a communication connection available, the process may determine 309 if bandwidth exists that is sufficient to support the process executing remotely. If there is sufficient bandwidth, the process may request 311 that a remote server spin up a version of the process, passing any initialization data needed. Again, the process can monitor the connection and if the connection begins to fail, for example, the process can spin up locally and receive any relevant data before the connection fails completely.

Local spin up may be contingent on communication failure or communication degradation. Many remotely executing processes will be passing data back to the vehicle for various output purposes while executing, so there may be little or no data transition needed to begin a local instance of a service without any visible interruption in handling. In other cases, the local process may need a good deal of data from the remote process in order to transition seamlessly or near seamlessly. In the former instance, local process spin up may be delayed until a connection is lost entirely, but in the latter instance, if desired, local process spin up may be executed at some point during connection fading, where the local processor anticipates a lost connection and requests transition data accordingly. If the connection stabilizes, the local transition need not be made, and the local service can simply be spun down. But if the connection is lost, the local data requested in advance of the loss can be used by the local process to provide a more seamless transition.

Figure 4B:
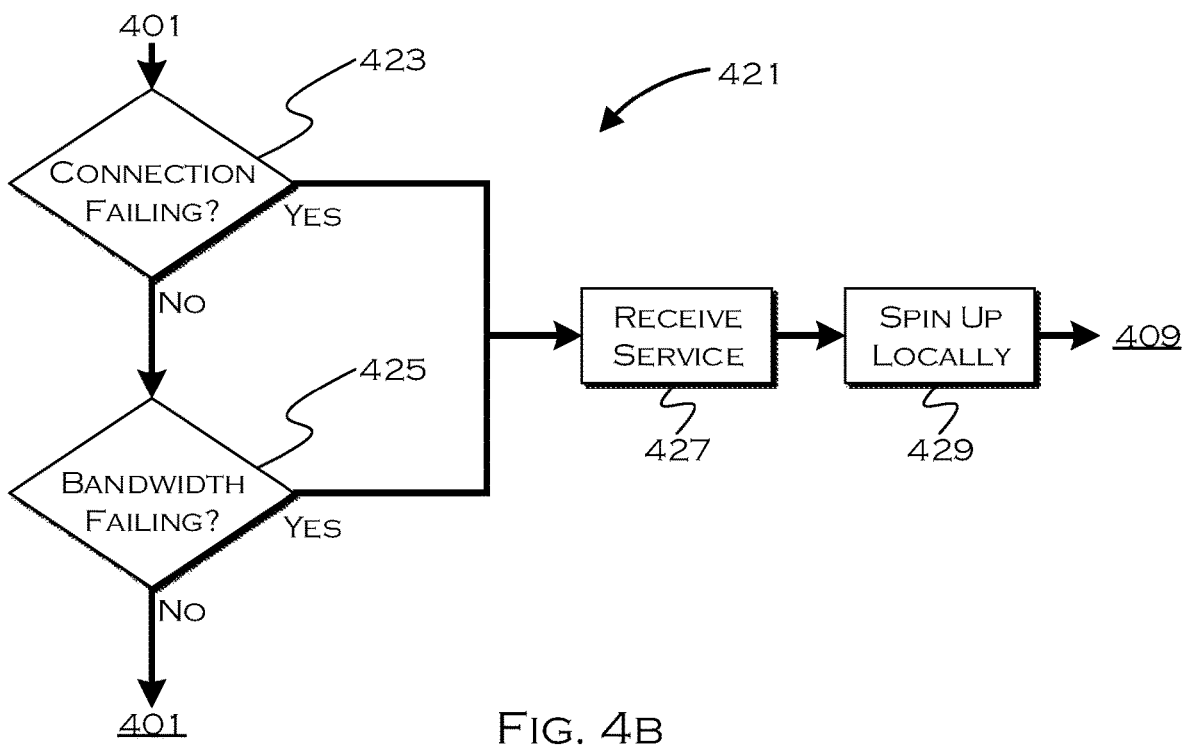
FIGS. 4A and 4B show illustrative service transfer processes.
Figure 4A:
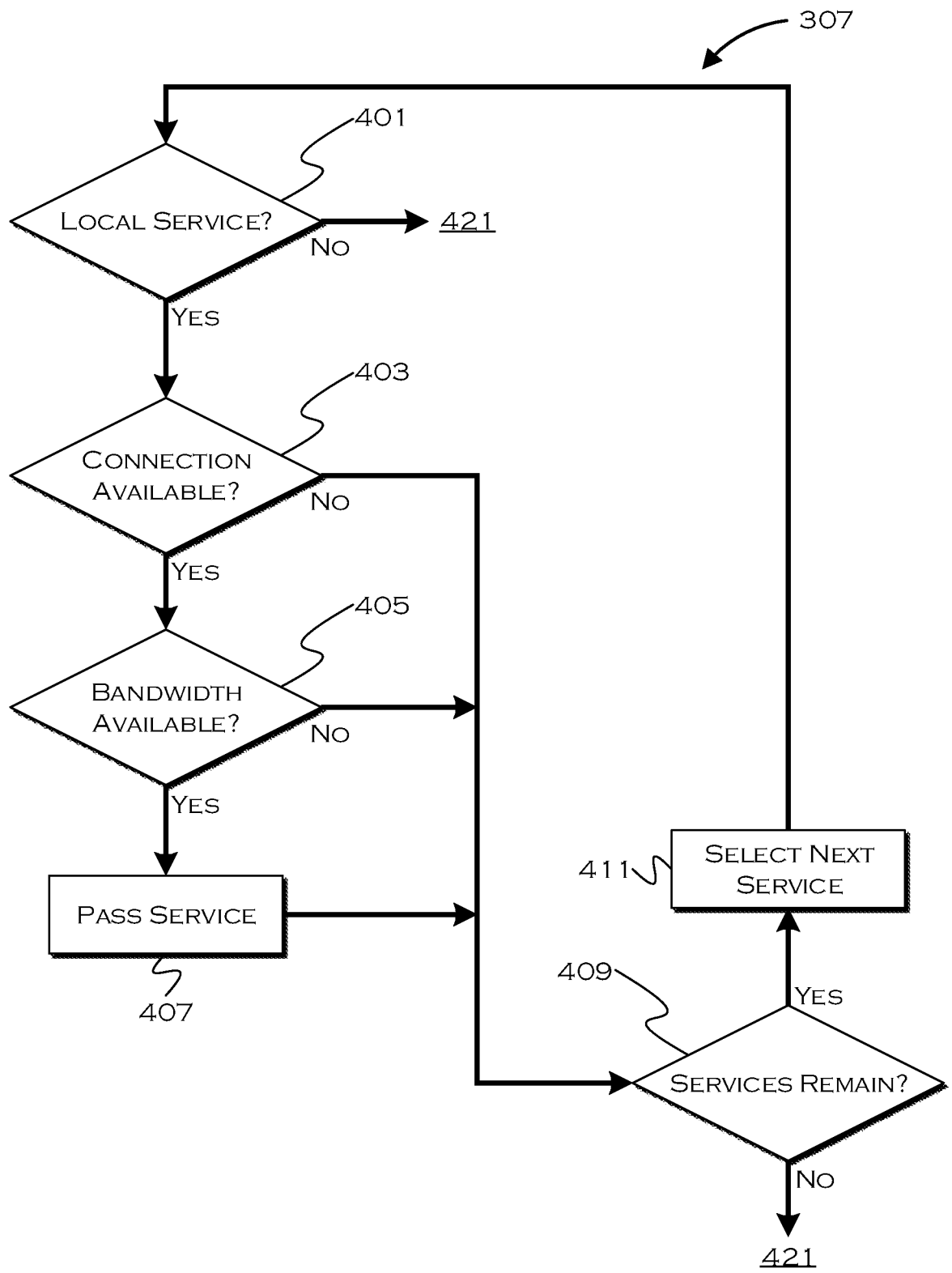

FIGS. 4A and 4B show illustrative service transfer processes. In the illustrative example shown in FIG. 4A, the handling process determines 401 if any services are executing locally. As long as one or more services are executing locally, the handling process can track connection availability for local services, so the services can be transitioned to remote handling when connections are available.

For any given local service executing, the process can check 403 to see if a connection that will support that service is available. The process can also check to see if bandwidth 405 that will support transitioning the service is available. Since there can be a plurality of local services executing, the process can act on an ordered list of services, ordered by preference of transfer, such that a first-considered service (for bandwidth consideration) is the "best" service to transfer. This allows the process to transition 407 services in order of preference. There are plenty of alternative models to achieve the same result, this example is discussed to demonstrate that transfer could be random or could be preferentially based on service parameters and/or bandwidth parameters.

If any local services remain 409, the process can select 411 a next service for transfer consideration and repeat the process. As long as any services remain, the process can continue checking for available bandwidth and transferring services as needed.

If any executing service is a remote service 401, the process can also track situations where the service should be transferred back to local processing. As previously stated, the process can always spin up local copies if and when a connection is completely lost, so the monitoring requirements may be minimal in those cases. In cases where the process is to transition services using remote data to smooth the transition, the process shown is an example of how the transition can be preconditioned.

Here, the process determines 423 if a connection is becoming spotty due to fading signals. The process also determines 425 if a bandwidth is changing, due to a fading connection or, for example, a new connection type that may cause a downgrade in bandwidth. If the process determines that either (or any other) scenario indicating that transition should occur is present, the process can receive 427 any data needed for local execution of the service. The process can then spin up 429 a local instance. If the transition to the local instance is never needed (because the connection never degrades or changes to dictate transition), the process can always spin down the local instance of the service with minimal impact on local processing.

The illustrative embodiments allow for utilization of both local and remote processing, and using bandwidth constraints and connection availability and connectivity options to dynamically redistribute processing in a manner that can better use available resource when those resources are actually available.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
detect an application initiation request;
determine whether current vehicle connectivity availability is sufficient to support remote execution of the application;
responsive to determining that current vehicle connectivity is insufficient to support remote execution, launch a local version of the application;
maintain a list of locally executing applications, in an ordered preference for transfer to remote execution; and
responsive to the monitored current vehicle connectivity becoming sufficient to execute at least one of the locally executing applications remotely, request remote execution of at least the highest transfer-priority application on the ordered list that also can be executed remotely based on the monitored current vehicle connectivity.

2. The system of claim 1, wherein the processor is configured to determine whether current vehicle connectivity availability is sufficient to support remote execution of the application based on available bandwidth.

3. The system of claim 2, wherein the processor is configured to determine whether current vehicle connectivity availability is sufficient to support remote execution of the application based on available bandwidth remaining in light bandwidth utilized by other remotely executing applications.

4. The system of claim 1, wherein the processor is configured to determine whether current vehicle connectivity availability is sufficient to support remote execution of the application based on measured connection strength.

5. The system of claim 1, wherein the processor is further configured to:

receive confirmation that the remote server has launched an instance of the application; and terminate the local version of the application responsive to the confirmation.

6. The system of claim 5, wherein the processor is configured to:

pass any application data, needed to continue application processes with minimal interruption, from the local version to the remote version, prior to terminating the local version.

7. The system of claim 5, wherein the processor is further configured to:

determine, following remote launch confirmation, that current vehicle connectivity has fallen below a level needed to maintain remote execution of the application; and responsive to determining that current vehicle connectivity has fallen below the level, launch a further local version of the application.

8. The system of claim 7, wherein the processor is further configured to instruct termination of the remotely launched application responsive to locally launching the further version.

9. The system of claim 8, wherein the processor is further configured to request any application data, needed to continue application processes with minimal interruption, from the remotely launched application, prior to instructing termination.

10. The system of claim 5, wherein the processor is further configured to:

predict, following remote launch confirmation, that current vehicle connectivity will fall below a level needed to maintain remote execution of the application; and responsive to determining that current vehicle connectivity will fall below the level, launch a further local version of the application.

11. The system of claim 10, wherein the processor is further configured to instruct termination of the remotely launched application responsive to locally launching the further version and responsive to detecting that the predicted low level of connectivity has been realized.

12. The system of claim 11, wherein the processor is further configured to request any application data, needed to continue application processes with minimal interruption, from the remotely launched application, prior to instructing termination.

13. The system of claim 10, wherein the processor is further configured to predict a region along a route wherein the predicted low level of connectivity is predicted to occur.

14. The system of claim 13, wherein the processor is configured to terminate the further local version when a vehicle passes through the predicted region without achieving the predicted low level of connectivity.

15. A computer-implemented method comprising:

receiving an application-launch request for a vehicle application;

determining whether to launch the application locally or remotely, based on whether current vehicle connectivity is sufficient to support remote execution of the application;

executing the application locally or instructing remote execution of the application, responsive to the determination; and maintaining a list of locally executing applications, in an ordered preference for transfer to remote execution; and responsive to the monitored current vehicle connectivity becoming sufficient to execute at least one of the locally executing applications remotely, requesting remote execution of at least the highest transfer-priority application on the ordered list that also can be executed remotely based on the monitored current vehicle connectivity.

16. The method of claim 15, wherein the determining includes determining whether current vehicle connectivity availability is sufficient to support remote execution of the application based on available bandwidth.

17. The method of claim 16, wherein the determining includes determining whether current vehicle connectivity availability is sufficient to support remote execution of the application based on available bandwidth remaining in light of bandwidth utilized by other remotely executing applications.

18. The method of claim 15, wherein the determining includes determining whether current vehicle connectivity availability is sufficient to support remote execution of the application based on measured connection strength.

* * * * *